United States Patent [19]

Miller et al.

[11] 4,023,044

[45] May 10, 1977

[54] AUTOMATIC MACHINE TOOL INCLUDING A MONITORING SYSTEM

[75] Inventors: Robert C. Miller; George T. Mallick, Jr., both of Pittsburgh, Pa.

[73] Assignee: Westinghouse Electric Corporation, Pittsburgh, Pa.

[22] Filed: Jan. 20, 1975

[21] Appl. No.: 542,315

[52] U.S. Cl. .............................. 307/116; 340/248 R; 310/8.1; 72/4

[51] Int. Cl.² ........................................ G08B 21/00

[58] Field of Search ................ 307/116; 83/72; 310/8.1; 340/248; 72/4, 31

[56] References Cited

UNITED STATES PATENTS

| | | | |
|---|---|---|---|
| 3,444,390 | 5/1969 | Breidenbach et al. | 310/8.1 UX |
| 3,573,781 | 4/1971 | Shoh | 310/8.1 X |

*Primary Examiner*—Herman J. Hohauser
*Attorney, Agent, or Firm*—Robert E. Converse, Jr.

[57] ABSTRACT

An automatic punch press and monitoring system. The monitoring system includes a piezoelectric accelerometer mounted within the stationary die shoe of the punch press, and electronic circuitry including a variable gain amplifier, a detector, an integrator, and a comparator. The monitoring system is manually placed in a "LEARN" mode whereupon the signal produced by the accelerometer during normal operation of the punch press is amplified, detected, and integrated over the time period of one stroke to produce a test function. The gain of the amplifier is automatically adjusted during successive normal strokes of the punch press until the test function is equal to an arbitrary set point, thereby establishing a reference function. The monitoring system is then automatically placed in an "AUTO CONTROL" mode whereupon on each succeeding stroke, with the gain of the amplifier fixed, the test function produced is compared with the reference function. If the test function is above a first high limit level corresponding to a percentage of the reference function and below a second high limit level corresponding to a second percentage of the reference function a check alarm is activated. If the test function is above the second high limit level or below a low limit level corresponding to a third percentage of the reference function the punch press is shut down.

17 Claims, 7 Drawing Figures

FIG. I

AUTOMATIC MACHINE TOOL INCLUDING A MONITORING SYSTEM

BACKGROUND OF THE INVENTION

1. Field of the Invention:

This invention relates to machine tools and more specifically to machine tools including means for automatically controlling the operation thereof.

2. Description of the Prior Art:

In an industrial society there is a constant demand for large quantities of identical parts for use in manufacturing a wide variety of articles. Many types of parts are produced by performing a repetitive mechanical operation upon stock material using a machine tool. One type of machine tool employs a rotating spindle to perform operations such as grinding or boring. Another type of machine tool uses a reciprocating hammer or ram to perform functions such as forging, planning, swagging, or punching. Both types perform repetitive operations, with each operation cycle having a substantially equal time period, i.e., the time required for a spindle to make one revolution or the time required for a ram to complete one stroke and return to its starting position.

Automatic operation of these machines allows repetitive cycling without the need for an operator to initiate each cycle. A large number of operations are performed per unit of time in this manner. However, the typical machine does not have the ability to detect improper operations. For example, it is not unusual for a punch press to produce hundreds of unusable parts because of a faulty die, improper stock feeding, or failure of lubrication. These malfunctions are detected and corrected by quality control personnel and machine operators.

Even more serious is the not infrequent occurrence of a foreign body becoming wedged between the tool surfaces. In a punch press, for example, this can result in a badly damaged die or even a damaged press. When this happens it is necessary to halt operation of the press and repair or replace the damaged components before production can resume. Since a damaged die can cost hundreds or even thousands of dollars to repair, the cost of maintenance and repair of dies is a significant fraction of the cost of operating an automatic punch press facility.

It would be desirable to provide a system which can detect improper machine tool operation and take corrective action before producing a large quantity of faulty parts or damaging the tool. One device for detecting improper operation of a punch press is described in U.S. Pat. No. 3,444,390 issued to Victor S. Breidenbach and Patrick V. Close. This device employs a piezoelectric transducer to detect accelerating disturbances produced by the punch press. Peak amplitudes produced by the transducer during normal operation of the punch press are compared to peak amplitudes produced by the transducer during subsequent operation of the punch press. If a signal peak from the transducer is greater than peaks produced during normal operation, the device will shut down the punch press.

Abnormally large peaks are produced when foreign material lodges in the punch press or upon occurrence of some other serious malfunctions. However, many types of irregular or abnormal machine tool operation do not produce abnormally large peaks, including conditions leading to serious failures. Thus, many types of malfunctions are not detected by merely monitoring peak amplitudes of signals produced by the transducer. It is desirable to provide an automatic machine tool system which would detect other types of abnormal operation including die wear or lack of lubrication. It is also desirable to provide a system providing highly automated operation requiring a minimum of operator action and calibration at startup, thereby providing a versatile machine which is easily set up for different jobs.

SUMMARY OF THE INVENTION

In accordance with the principles of the present invention, there is provided a machine tool system for performing a repetitive operation upon a workpiece comprising a machine tool and a monitoring system. The monitoring system comprises a transducer mounted in association with the machine tool for producing a signal in response to mechanical impulses developed by operation of the machine tool. The signal is detected and applied to the input of means generating a test function which is a function of both time and the amplitude of the transducer signal. Means are provided for producing a reference function proportional to the test function evaluated during normal operation of the machine tool and for comparing this reference function with the test function evaluated during subsequent operation. The comparator generates an output signal for controlling operation of the machine tool when the test function and the reference function differ by more than a predetermined amount.

BRIEF DESCRIPTION OF THE DRAWINGS

The invention may be more readily understood by reference to the drawings, in which.

DESCRIPTION OF THE PREFERRED EMBODIMENT

Figure 1:
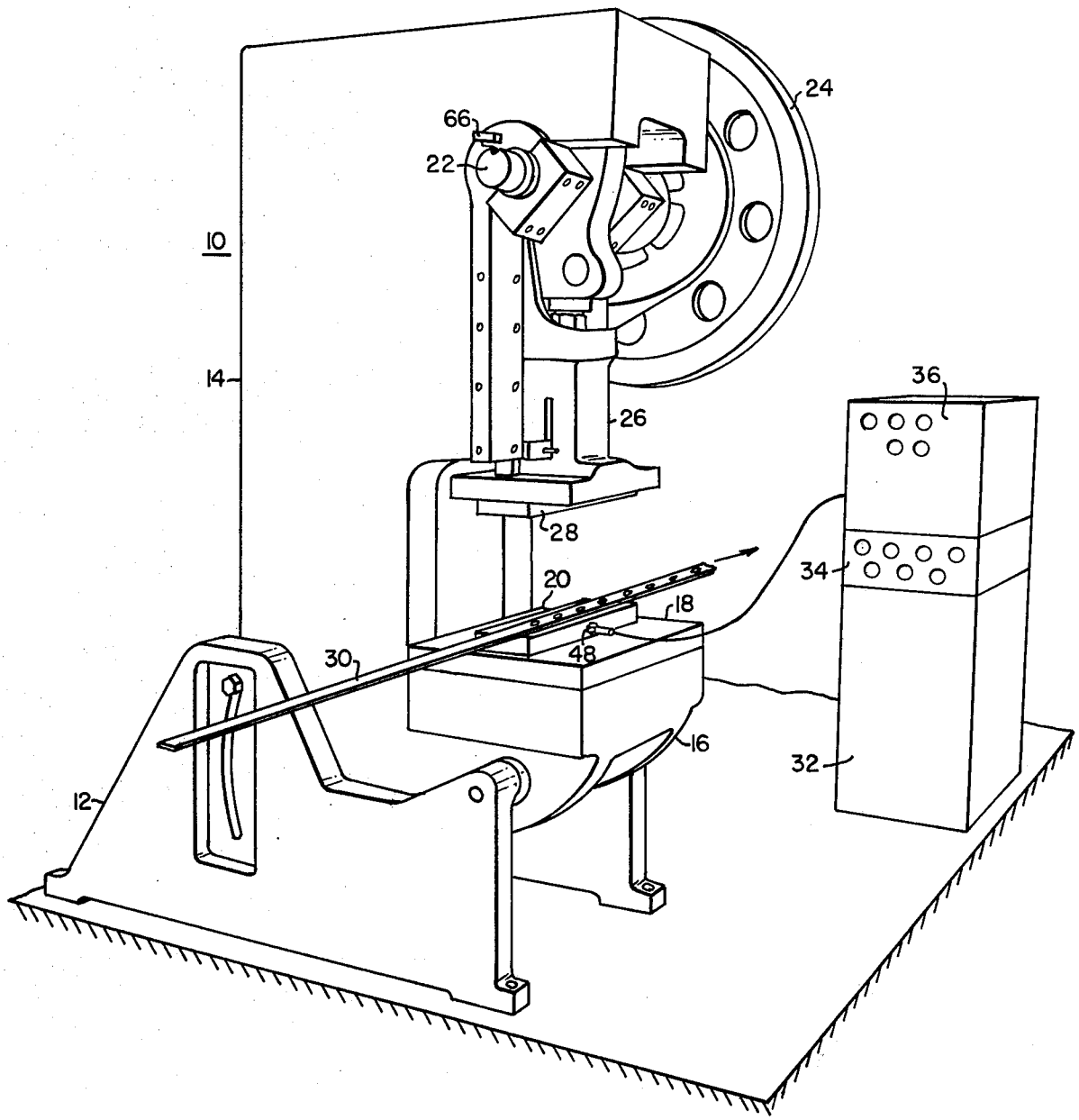
FIG. 1 shows a punch press and monitoring system constructed in accordance with the present invention.

Throughout the drawings, like reference characters refer to like elements.

Referring now to the drawings, and FIG. 1 in particular, there is shown an automatic punch press and monitoring system constructed according to the principles of the present invention. A punch press 10 includes a base 12 and a generally C-shaped frame 14 attached to the base 12. The lower arm 16 of the frame 14 forms a bolster plate 18 upon which is mounted a stationary die shoe 20. A drive shaft 22 extends transversely through the upper arm of the frame 14 and has attached to it a flywheel 24. Also attached to the drive shaft 22 is a mechanism in the interior of the frame 14 for converting rotary motion of the drive shaft into reciprocating vertical motion of a ram 26. Attached to the ram 26 is a movable die shoe 28 having a plurality of surfaces which cooperate and mate with corresponding surfaces in the stationary die shoe 20 attached to the bolster plate 18.

Stock material 30, such as ribbon steel, is fed between the die shoes 20 and 28 by a feed mechanism not shown. Rotation of the drive shaft 22 causes the ram 26 and attached movable die shoe 28 to be driven with great force down onto the stock material 30 and into the engagement with the stationary die shoe 20. The force of the blow causes pieces to be punched, bent, or otherwise formed from the stock material 30, thereby producing shaped metal parts. In normal operation the drive shaft 22 is continuously rotating, causing reciprocation of the ram 26. The feed mechanism is synchronized with operation of the drive shaft to advance the ribbon steel 30 after each punch stroke, thereby presenting fresh material to the mating surfaces of the moving and stationary die shoes and producing a continuous output of shaped metal parts.

Figure 7:
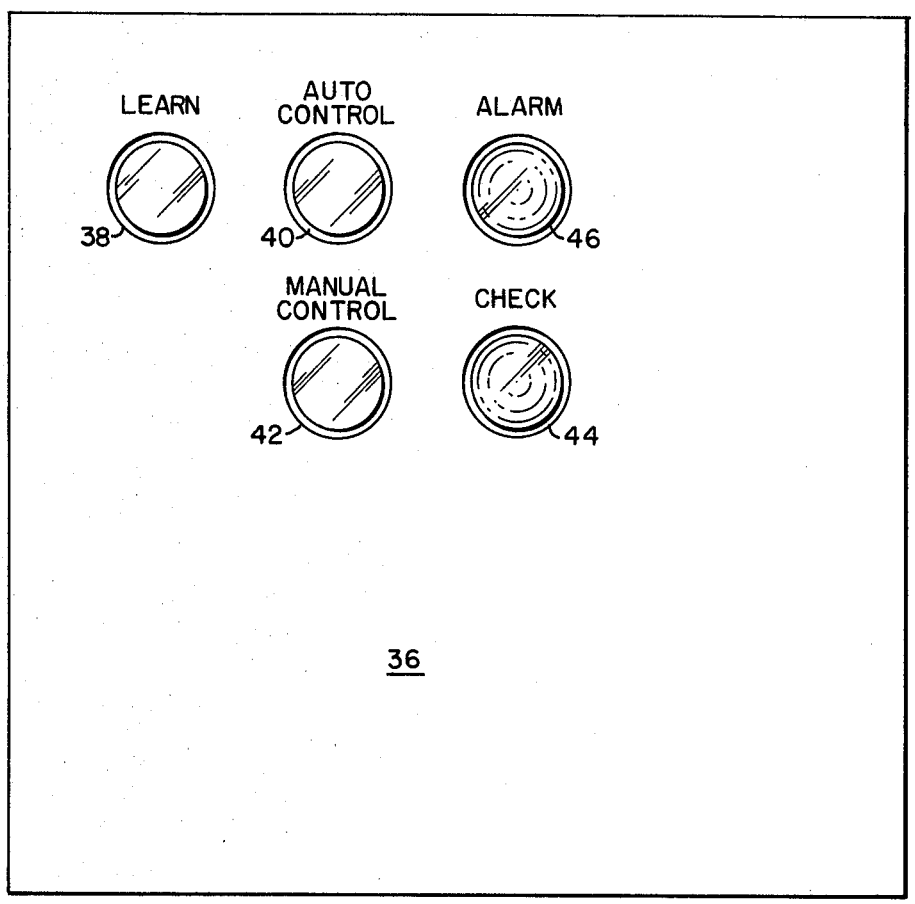
FIG. 7 shows the monitoring system control box.

Located next to the punch press 10 on a separate pedestal 32 are the operating controls 34 for the punch press. These controls allow the operators to inch the press through small increments of a complete revolution of the drive shaft 22, to initiate single strokes of the punch press, and to initiate continuous operation of the punch press. Located above the operating controls 34 is the monitoring system control box 36. The monitoring system control box 36, shown more clearly in FIG. 7, includes three lighted pushbutton controls 38, 40, 42 and two warning lights 44, 46.

Figure 2:
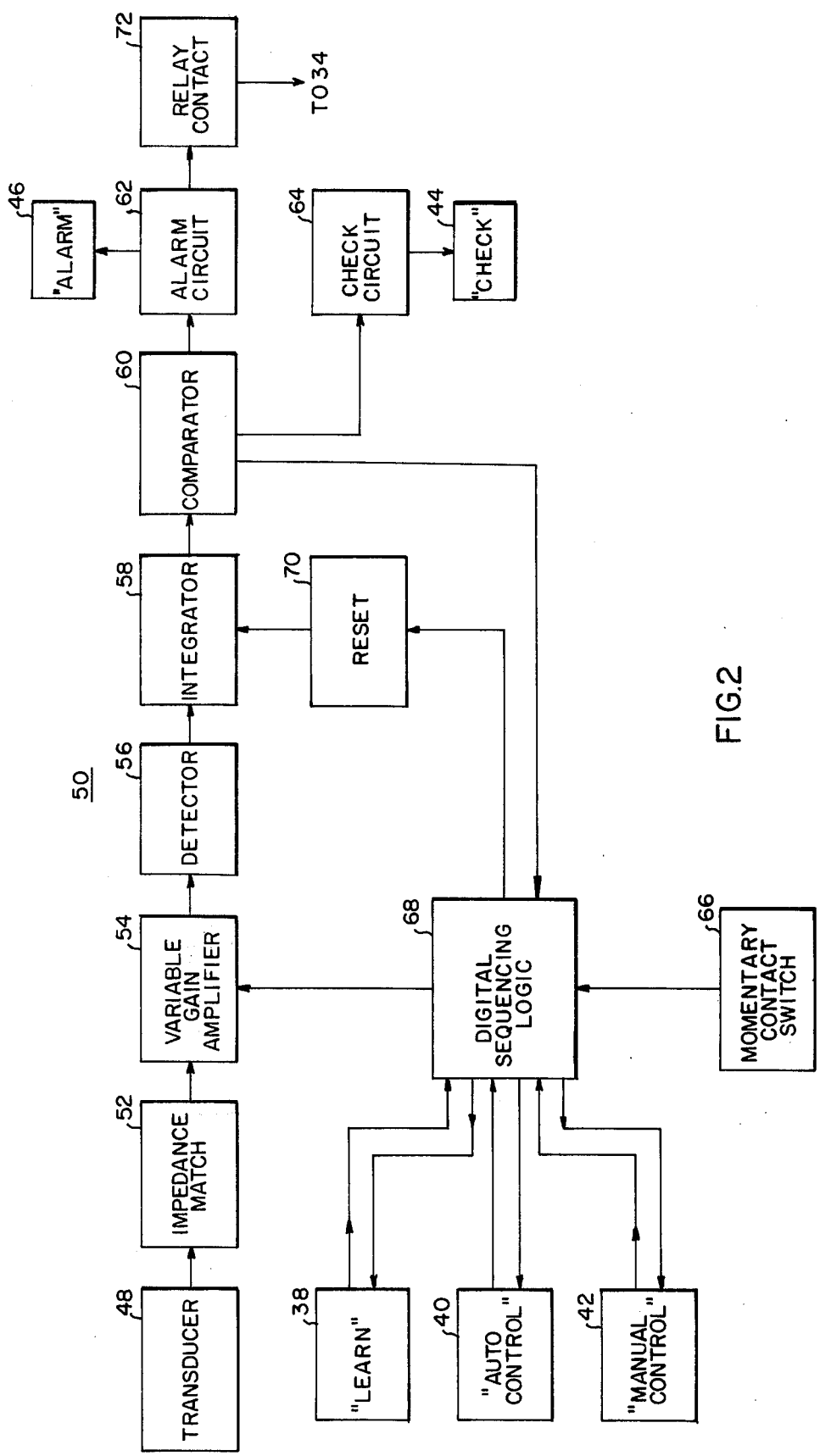
FIG. 2 is a block diagram of the monitoring system.

A transducer 48, such as a piezoelectric accelerometer, is mounted in a threaded hole within the stationary die shoe 20. Operation of the punch press 10 causes the transducer 48 to produce an electrical signal in response to mechanical impulses generated in the die shoes by the punch press operation. The transducer is connected by coaxial cable to an electronic circuitry of the monitoring system 50 contained within the monitoring system control box 36. The monitoring system 50, shown in block diagram form in FIG. 2, includes impedance matching circuitry 52 to convert the high impedance output of the transducer 48 to low impedance required by succeeding stages of the monitoring system. The output of the impedance matching circuitry 52 is connected to the input of a variable gain amplifier 54. The output of the variable gain amplifier 54 is connected to a detector device 56 to convert to direct current the alternating current signals produced by the transducer 48 and passed by preceding stages of the monitoring system.

The output from the detector 56 is fed to the input of an integrator 58 which computes the time integral of the signal from the detector 56. The output of the integrator 58 constitutes a test function which is fed into a comparator 60 to compare the test function with a predetermined reference function and actuate circuits 62 or 64 when the test signal exceeds the reference level by more than a certain amount.

Referring once again to FIG. 1, a momentary contact switch 66 attached to the frame 14 is actuated once for every revolution of the drive shaft 22, thereby producing a synchronization pulse when the ram 26 is at the top of the stroke. The momentary contact switch 66 is connected to the monitoring system control box 36 to feed the synchronization pulses to digital sequencing logic indicated at 68 in FIG. 2. Other inputs to the digital sequencing logic are provided by the lighted pushbuttons 38, 40 and 42 on the monitoring system control box. Outputs from the digital sequencing logic 68 are connected to the variable gain amplifier 54 and reset device 70 indicated in FIG. 2. The digital sequencing logic 68 operates to control the operation of the monitoring system as will be hereinafter described.

The output of the monitoring system is a relay contact 72 which is connected in series with the control circuitry of the punch press. The contact 72 is normally closed, thereby permitting normal operation of the punch press without operation of the monitoring system. The relay contact 72 is opened causing a shut down of the punch press, under conditions to be described hereinafter. Other types of devices for generating a control signal, such as a triac, could also be used in place of the relay contact 72.

Figure 3:
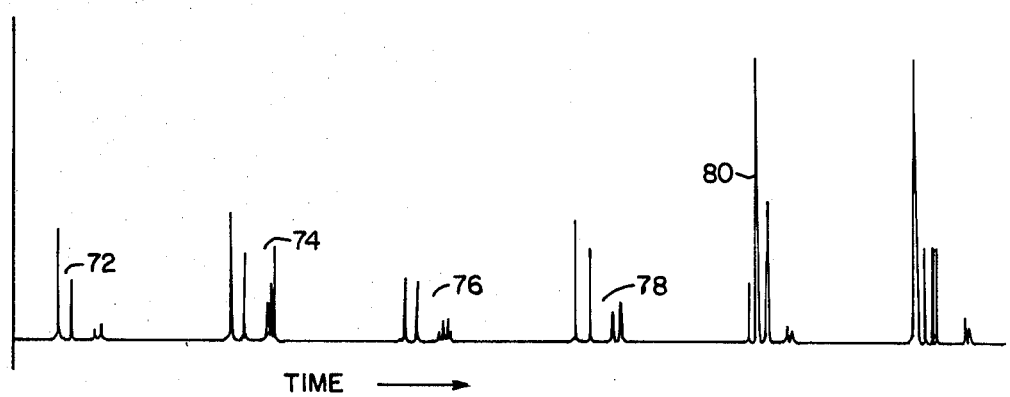
FIG. 3 represents the signal produced at the output of the detector 56 shown in FIG. 2 during four normal punch press strokes followed by a punch press stroke in which a serious jam has occurred.

The signal produced by the transducer 48 during operation of the punch press 10 is shown in FIG. 3, after passing through the amplifier 54 and detector 56. The patterns indicated at 72, 74, 76 and 78 represent normal punch strokes producing acceptable parts. During the time interval between the points indicated at 78 and 80 a small piece of one of the die shoes 20 and 28 broke off and became lodged between the surfaces of the die shoes. The next succeeding stroke indicated at 80 produced the transducer signals shown, and caused severe damage to the die shoes 20 and 28 before the press 10 was shut down by operator action. Prior art devices employed means to detect abnormally high peak transducer readings and shut down the machine tool whenever the signal exceeded a given threshold level. Such devices would detect the condition shown in FIG. 3, and successfully shut down the press before severe damage occurred.

Figure 5:
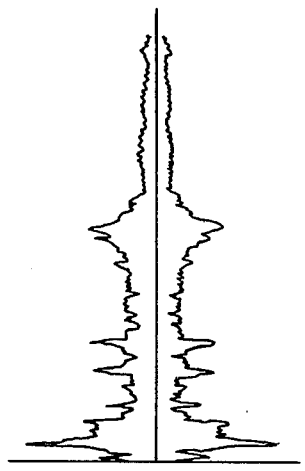
FIG. 5 represents the signal produced as in FIG. 4 during a stroke in which a failure of the feed mechanism has occurred, producing a miscut.
Figure 4:
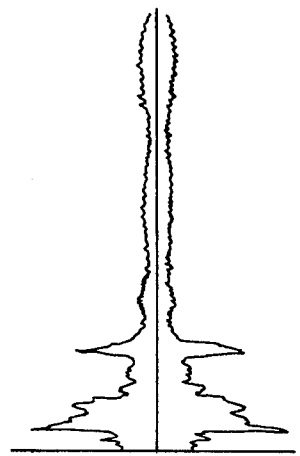
FIG. 4 represents the signal produced at the output of the amplifier 54 shown in FIG. 2 during a normal stroke of a punch press having a different die than the press of FIG. 3.

FIG. 4 shows the signal produced at the output of the amplifier 54 during a normal stroke of a punch press and die combination different from that shown in FIG. 3. In FIG. 5 a similarly obtained signal is shown wherein a malfunction has occurred in the feed mechanism preventing the stock 30 from being fully advanced the proper distance into the die shoes upon successive strokes. The punch thus slightly overlaps the holes produced in the previous stroke. This condition could lead to defective parts and rapid wear of the die shoes. Note that the peak signals of FIG. 5 are equal to or less than the peak signals produced during normal operation of the press as shown in FIG. 4. Thus, a monitoring system employing means responding only to abnormally high peak signals produced by the transducer would not detect the malfunction indicated in FIG. 5.

Figure 6:
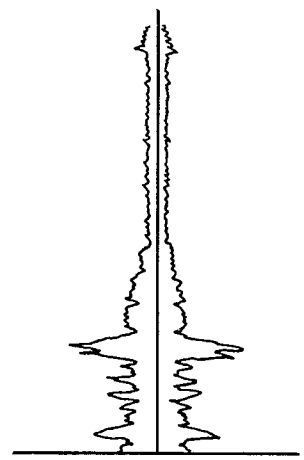
FIG. 6 represents the signal produced as in FIG. 4 for a stroke in which the die has become worn, producing a part having a burr.

FIG. 6 shows a signal obtained as in FIGS. 4 and 5 during operation of the press when the die shoes 20 and 28 have become worn and parts being produced have significant burrs. This condition also leads to unacceptable parts. Again, the peak signals produced under these undesirable conditions are equal to or less than peak signals produced during normal operation, and a device employing a peak signal monitor would not detect this malfunction.

A monitoring system employing means generating a test function which is a function of both time and the amplitude of the signal produced by the transducer during operation of the machine tool will significantly increase the sensitivity of the monitoring system to abnormal operating conditions of the punch press. By employing means producing a synchronization pulse at the same time during each repetitive machine tool operation the signal relationship to the time period of operation of the machine tool can be analyzed. In the monitoring system indicated in FIG. 2, the synchronization pulses produced by the momentary contact switch 66 are fed through the sequencing logic 68 to the integrator 58 which sums the signal produced by the transducer 48. These synchronization pulses are used to reset the integrator 58 at a given point in the time period of the punch press stroke and compute the time integral of the transducer signal over the period of the stroke. By integrating the signal produced by the transducer 48 during one repetitive machine tool operation under normal conditions and maintaining amplifier gain settings, the time integral produced over successive machine tool operations can be compared. The integrator is thus generating a test function which is a function of both transducer signal amplitude and of time, allowing the monitoring system to analyze the total signal produced over the time period of one repetitive machine tool operation rather than merely the peak amplitude of signals so produced. By analyzing and comparing the time integral of the signal produced, malfunctions causing either higher than normal or lower than normal time integrals can be detected. For example, total failure of stock feed would result in a much lower time integral than during normal operation. This lower time integral would result in an alarm being produced.

To operate the automatic punch press and monitoring system employing principles of the present invention the operator sets up the press 10 in a normal manner. Using the standard punch press operating controls 34 he initiates repetitive operation of the press and verifies that acceptable parts are being produced. With normal operation so verified, the operator presses the "LEARN" lighted pushbutton 38, which is immediately illuminated. From this point on, operation is completely automatic and no further operator action is required. The digital sequencing logic 68 causes the variable gain amplifier 54 to be set to its lowest gain level. Signals from the transducer 48 are fed through the impedance matching circuit 52, the amplifier 54, and the detector 56 into the integrator 58. The signal is summed by the integrator until the first synchronization pulse is received by the digital sequencing logic 68 from the momentary contact switch 66. If the test function, that is, the integrator output signal, is at this time lower than a predetermined arbitrary set point level, for example 1 volt, the digital sequencing logic 68 increases the gain of the variable gain amplifier 54 prior to the next succeeding punch press stroke. The signal from the transducer 48 during this stroke is similarly amplified, detected, integrated and compared against the 1 volt level. The gain of the amplifier 54 is automatically increased by the digital sequencing logic 68 on successive strokes until the test function produced by the integrator 58 during a stroke exceeds the arbitrary set point level of 1 volt. On succeeding strokes following this stroke at which the test function exceeded the set point level, the digital sequencing logic 68 automatically increases the set point level above 1 volt until the difference between the test function over one complete stroke and the arbitrary set point level is less than approximately 0.12 volts. The set point level thus represents the test function evaluated during normal operation of the press. It then becomes the reference function. The digital sequencing logic 68 then extinguishes the LEARN lighted pushbutton 38 and illuminates the "AUTO CONTROL" lighted pushbutton 40 on the monitoring system control box 36. The system is now in AUTO CONTROL mode and the gain of the variable gain amplifier 54 will be maintained on all succeeding strokes of the punch press. A reference function has thus been automatically generated. The signal produced by the transducer 48 during all successive strokes is then amplified at this gain level, detected, and integrated.

If the test function evaluated on any succeeding stroke exceeds the reference function by a first predetermined amount, the "CHECK" light 44 is illuminated upon the monitoring system control box 36. This indicates that a malfunction has occurred which is not serious enough to warrant shutting down the press but demands the operator's attention. If the output of the integrator 58 exceeds the reference function by a second predetermined amount larger than the first predetermined amount, the "ALARM" light 46 is illuminated. In addition, the monitoring system opens the relay contact 72 when the next synchronization pulse is received. This causes the control circuit of the punch press to shut down the press. This shutdown operation and "ALARM" light illumination is also performed if the test function during any stroke of the punch press is below the reference function by more than a predetermined amount, indicating a malfunction of the punch press such as failure of the feed mechanism.

At any time during operation of the punch press the operator can energize the "MANUAL CONTROL" lighted pushbutton 42. This removes the monitoring system from any control of the punch press. However, the gain of the variable gain amplifier 54 remains at the setting determined during the previous LEARN operation. Thus, the operator can later energize the AUTO CONTROL lighted pushbutton 40, reinserting the monitoring system into the control loop and comparing the signal produced by the transducer 48 during all succeeding strokes to normal conditions of the previous LEARN operation.

The transducer in this described embodiment is mounted upon the stationary die shoe 20 of the machine tool. It could, however, be mounted in the bolster plate 18 of the punch press 10 or other convenient position in association with a machine tool wherein mechanical impulses produced by the operation of the machine tool would be detected by the transducer. Other types of transducers can also be used. For instance, a microphone can be mounted in the vicinity of the two die shoes to produce a signal in response to the sound produced by the operation of the punch press.

The principles of the present invention can also be employed in machine tools using a rotating spindle. A magnetic pickup can be used to produce a synchronization pulse during each revolution of the spindle. The signal produced by the transducer during each revolution of the spindle can then be analyzed and integrated as was previously described for the punch press operation. Such a system would detect conditions such as improper tool speed, improper cutting rate, dull or broken tool bits, excessive vibrations and lack of proper lubrication to the cutting surfaces.

More detailed analysis could also be accomplished using principles of the present invention. For example, two or more integrators could be used to analyze different portions of the machine tool operation cycle. Gating circuitry could be used to turn on a high-sensitivity integrator during portions of the cycle during which normal operation of the machine tool produces very low amplitude signals and a second integrator of lower sensitivity could be turned on only during those portions of the cycle when normal operation produces higher level signals. Thus much finer resolution could be obtained and closer tolerance alarming accomplished.

For even greater sophistication, a computer could be employed to measure the amplitude of the signal produced at each of many small increments of time over the period of one normal repetitive machine tool operation. The amplitude during each increment would be stored in computer memory, the set of amplitude values constituting a reference function corresponding to the time integral generated in the previously described embodiment. The set of signal amplitude values produced by the transducer at each increment of time during successive machine tool operations would constitute a test function to be compared with the reference function. This computer control monitoring system would be useful where a very high degree of precision is required in parts produced by a machine tool. A precise computer analysis of the test functions as a function of time would also be useful as a diagnostic tool in evaluating die performance and die design.

From the foregoing, it is seen that the present invention has provided a new and improved automatic machine tool and monitoring system. While the invention has been shown and described in only one form, it will be obvious to those skilled in the art that it is not so limited, but is susceptible to various changes and modifications without departing from the spirit thereof.

What we claim is:

1. A machine tool system for performing a repetitive operation upon a workpiece, said system comprising a machine tool and a monitoring system, said monitoring system comprising:
 a transducer mounted in association with said machine tool for producing a signal in response to mechanical impulses developed by operation of said machine tool;
 means for generating a test function which is a function of said transducer signal;
 means for automatically generating a reference function representative of said test function evaluated during normal operation of said machine tool; and
 means for comparing said test function with said reference function and for generating a control signal for controlling operation of said machine tool when said test function and said reference function differ by more than a predetermined amount.

2. A machine tool system as described in claim 1 wherein said test function is evaluated for each repetitive machine tool operation.

3. A machine tool system for performing a repetitive operation upon a workpiece, said system comprising a machine tool and a monitoring system, said monitoring system comprising:
 a transducer mounted in association with said machine tool for producing a signal in response to mechanical impulses developed by operation of said machine tool;
 means for generating a test function which is a function of said transducer signal, said test function also being a function of time,
 means for generating a reference function representative of said test function evaluated during normal operation of said machine tool; and
 means for comparing said test function with said reference function and for generating a control signal for controlling operation of said machine tool when said test function and said reference function differ by more than a predetermined amount.

4. A machine tool system as described in claim 3 wherein said transducer signal is time dependent and said test function is a function of the time dependence of said transducer signal.

5. A machine tool system as described in claim 3 wherein said test function generating means comprises integrating means for generating an output proportional to the time integral of said transducer signal amplitude over the time period of each repetitive machine tool operation.

6. A machine tool system as described in claim 5 further comprising means producing a synchronizing pulse at the same point in each repetitive machine tool operation, said synchronizing pulse resetting said integrating means once during each repetitive machine tool operation.

7. A machine tool system as described in claim 6 further comprising a variable gain amplifier connected between said transducer and said integrator.

8. A machine tool system as described in claim 7 wherein said reference function generating means comprises sequencing means for varying the gain of said amplifier during normal operation of said machine tool to cause the output of said integrating means at the time a synchronizing pulse is produced to be substantially equal to an arbitrary setpoint level.

9. A machine tool system as described in claim 3 wherein said transducer comprises a piezoelectric accelerometer.

10. A machine tool system as described in claim 3 wherein said transducer comprises a microphone.

11. A system for controlling a machine tool performing repetitive operation, said system comprising:
 a transducer adapted to be mounted in association with a machine tool, said transducer constructed to produce, a signal in response to mechanical impulses developed by operation of an associated machine tool;
 means for generating a test function which is a function of the amplitude of said transducer signals;
 means for automatically generating a reference function representative of said test function evaluated during normal operation of said machine tool; and
 means comparing said test function with said reference function and generating a control signal for controlling operation of said machine tool when said test function and said reference function differ by more than a predetermined amount.

12. A system for controlling a machine tool as described in claim 11 wherein said test function is evaluated for each repetitive operation of an associated machine tool.

13. A system for controlling a machine tool, said system comprising:
 a transducer adapted to be mounted in association with a machine tool, said transducer constructed to produce a signal in response to mechanical impulses developed by operation of an associated machine tool;

means for generating a test function which is a function of the amplitude of said transducer signals, said test function also being a function of time;

means for generating a reference function representative of said test function evaluated during normal operation of said machine tool; and means comparing said test function with said reference function and generating a control signal for controlling operation of said machine tool when said test function and said reference function differ by more than a predetermined amount.

14. A machine tool system as described in claim 13 wherein said transducer signal amplitude is time dependent, and said test function is a function of the time dependence of said transducer signal amplitude.

15. A system as recited in claim 13 comprising first control means for initiating the automatic generation of said reference function.

16. A system as recited in claim 15 comprising first indicating means for indicating that said system is in the process of automatically generating said reference function.

17. A system as recited in claim 16 comprising second indicating means for indicating that said reference function has been generated, that said test function is being generated for each repetitive machine tool operation, that said test and reference function are being compared, and that alarm and control action will be preferred whenever said test and reference functions differ by more than a predetermined amount.

* * * * *